(12) United States Patent
Cuvillier et al.

(10) Patent No.: US 11,808,217 B2
(45) Date of Patent: Nov. 7, 2023

(54) METHOD FOR REGULATING THE TEMPERATURE OF THE EXHAUST GASES OF A TURBOMACHINE

(71) Applicant: SAFRAN AIRCRAFT ENGINES, Paris (FR)

(72) Inventors: Romain Guillaume Cuvillier, Moissy-Cramayel (FR); Pierre Cabrera, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 151 days.

(21) Appl. No.: 17/439,172

(22) PCT Filed: Mar. 5, 2020

(86) PCT No.: PCT/FR2020/050444
§ 371 (c)(1),
(2) Date: Sep. 14, 2021

(87) PCT Pub. No.: WO2020/188177
PCT Pub. Date: Sep. 24, 2020

(65) Prior Publication Data
US 2022/0162997 A1 May 26, 2022

(30) Foreign Application Priority Data
Mar. 15, 2019 (FR) ...................................... 1902699

(51) Int. Cl.
*F02C 9/28* (2006.01)
*F01D 11/20* (2006.01)

(52) U.S. Cl.
CPC ................ *F02C 9/28* (2013.01); *F01D 11/20* (2013.01); *F05D 2220/70* (2013.01); *F05D 2270/112* (2013.01)

(58) Field of Classification Search
CPC ...................................................... F01D 11/20
See application file for complete search history.

(56) References Cited

U.S. PATENT DOCUMENTS 10,676,199 B2 6/2020 Hon et al.
2011/0302927 A1 12/2011 Ajami et al.
(Continued)

FOREIGN PATENT DOCUMENTS

CN 103133060 A 6/2013
CN 104995376 A 10/2015
(Continued)

OTHER PUBLICATIONS

International Search Report as issued in International Patent Application No. PCT/FR2020/050444, dated Aug. 18, 2020.

*Primary Examiner* — Katheryn A Malatek
(74) *Attorney, Agent, or Firm* — Pillsbury Winthrop Shaw Pittman LLP

(57) ABSTRACT

A method for regulating the temperature of the exhaust gases of a turbomachine, the method including regulation of the injection of fuel into a combustion chamber of the turbomachine so that the turbomachine generates a target thrust; regulation of the injection of mechanical power by an electric motor onto a shaft driven in rotation by a turbine, the electric motor being activated when a clearance between a casing and the blades of the turbine exceeds a threshold value.

12 Claims, 1 Drawing Sheet

(56) References Cited

U.S. PATENT DOCUMENTS

| | | | | |
|---|---|---|---|---|
| 2014/0123620 A1* | 5/2014 | Huntington | ............... | F02C 9/50 |
| | | | | 60/39.52 |
| 2017/0234237 A1* | 8/2017 | Pech | ...................... | F01D 15/10 |
| | | | | 60/778 |
| 2017/0342908 A1 | 11/2017 | Hon et al. | | |
| 2018/0283274 A1 | 10/2018 | Jackowski et al. | | |
| 2019/0002116 A1* | 1/2019 | Gansler | ................... | F01D 11/20 |
| 2019/0003397 A1* | 1/2019 | Gansler | .................. | B64D 27/02 |
| 2019/0345837 A1* | 11/2019 | Bacic | ....................... | F01D 11/24 |
| 2020/0025149 A1* | 1/2020 | Hrach | ..................... | F01D 13/00 |
| 2020/0079517 A1* | 3/2020 | Terwilliger | ............. | F01D 15/10 |

FOREIGN PATENT DOCUMENTS

| | | |
|---|---|---|
| CN | 109018377 A | 12/2018 |
| EP | 1 990 519 A2 | 11/2008 |
| EP | 3 236 051 A1 | 10/2017 |
| JP | 2003-201864 A | 7/2003 |

\* cited by examiner

[Fig. 1]
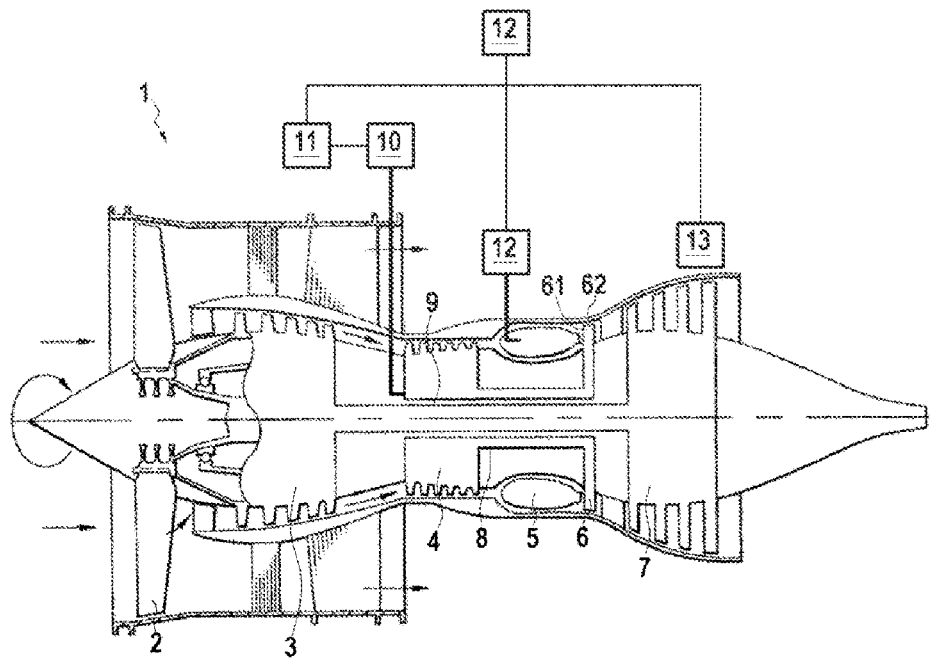
[Fig. 2]
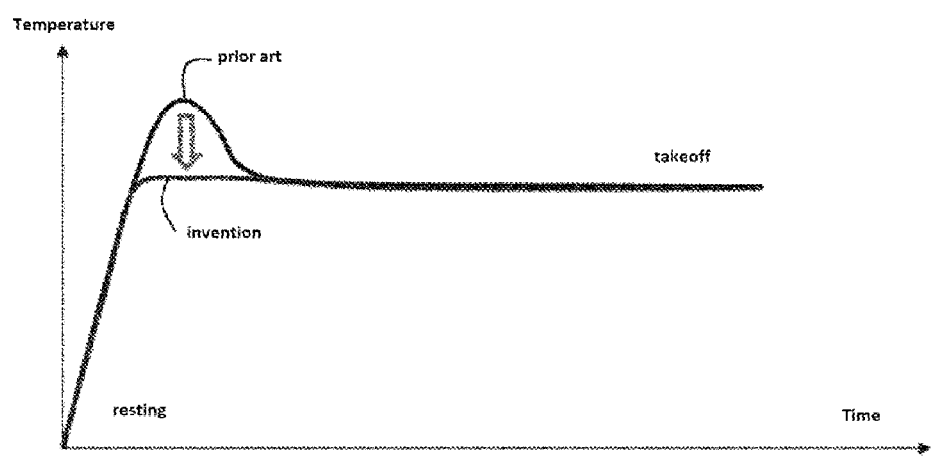

METHOD FOR REGULATING THE TEMPERATURE OF THE EXHAUST GASES OF A TURBOMACHINE

CROSS-REFERENCE TO RELATED APPLICATIONS

This application is the U.S. National Stage of PCT/FR2020/050444, filed Mar. 5, 2020, which in turn claims priority to French patent application number 1902699 filed Mar. 15, 2019. The content of these applications are incorporated herein by reference in their entireties.

TECHNICAL FIELD

The present invention applies to the general field of turbomachines for aircraft.

PRIOR ART

Currently, during the takeoff of an aircraft which comprises a turbomachine which is cold, for example during the first cycle of the turbomachine of the day, a current turbomachine can encounter a peak of the temperature of the exhaust gases.

In fact, when the turbomachine has attained its takeoff thrust, the exhaust temperature of the gases can reach a temperature peak, which contributes to the deterioration of the turbomachine. In addition, in order to take into account this phenomenon, a margin is provided between the maximum do-not-exceed temperature and the dimensioning temperature at which the turbomachine is designed to operate, this margin negatively impacting the efficiency of the turbomachine.

In addition, this exhaust gas temperature peak occurs at each cycle, but is all the greater when the turbomachine is cold.

DISCLOSURE OF THE INVENTION

The present invention therefore has as its main goal to supply a solution responding to the problem described previously.

According to a first aspect, the invention relates to a method for regulating a temperature of the exhaust gases of a turbomachine, the method comprising the following steps:
  regulation of the injection of fuel into a combustion chamber of the turbomachine so that the turbomachine generates a target thrust;
  regulation of the injection of mechanical power by an electric motor onto a shaft driven in rotation by a turbine, the electric motor being activated when a clearance between a casing and the blades of the turbine exceeds a threshold value.

In fact, the Applicant has noticed that the overheating of the turbomachine is caused by a phenomenon of temporary opening of the clearance at the tips of the blades of the turbine, and in particular of the high-pressure turbine. The opening of the clearance occurs due to a difference in thermal dilation between the casing and the blades of the turbine. In fact, the casing of the turbine has a thermal inertia which is generally smaller than the thermal inertia of the disks of the turbine. This increase in the clearance between the casing and the tip of the blades of the turbine negatively impacts the efficiency of the turbine, thus causing an increase in fuel consumption, the increase in fuel consumption causing the increase of the temperature of the exhaust gases of the turbomachine, at a given thrust.

Advantageously, the invention relates to a method for regulating the temperature of the exhaust gases of the turbomachine of an aircraft for a takeoff phase of said aircraft.

According to one possible feature, the regulation of the injection of mechanical power by the electric motor is accomplished by determining a temperature of the exhaust gas of the turbomachine, the electric motor injecting mechanical power onto the shaft driven in rotation by the turbine when the temperature of the exhaust gases of the turbomachine reaches a predetermined threshold value.

According to one possible feature, the injection of mechanical power onto the shaft driven in rotation by the turbine is variable depending on the exceedance of the exhaust gas temperature of the turbomachine with respect to the predetermined threshold value.

According to one possible feature, the temperature of the exhaust gases of the turbomachine is determined based on the injection of fuel into the combustion chamber.

According to one possible feature, the temperature of the exhaust gases of the turbomachine is determined by measurement with a sensor.

According to one possible feature, the regulation of the injection of mechanical power by the electric motor is accomplished by determining the clearance between the casing and the blades of the turbine, the electric motor injecting mechanical power onto the shaft driven in rotation by the turbine when the clearance between the casing and the blades of the turbine reaches the threshold value.

According to one possible feature, the injection of mechanical power onto the shaft driven in rotation by the turbine is variable depending on the exceedance of the clearance between the casing and the blades of the turbine with respect to the threshold value. Thus, the injection of mechanical power can be the greater as the clearance between the casing and the blades of the turbine exceeds the threshold value.

According to one possible feature, the clearance between the casing and the blades of the turbine is determined by measurement with a sensor.

According to one possible feature, the clearance between the casing and the blades of the turbine is determined based on a model constructed based on engine parameters measured by the control system. Thus, according to one possible feature, the clearance between the casing and the blades of the turbine is determined based on a temperature of the air in the turbine (the temperature of the stream) and on a temperature of the casing of the turbine.

According to one possible feature, the clearance between the casing and the blades of the turbine is determined based on a temperature of the casing of the turbine and on a temperature of a disk of the turbine.

According to one possible feature, the regulation of the injection of mechanical power by the electric motor is accomplished by measuring the thrust generated by the turbomachine, the electric motor injecting mechanical power onto the shaft driven in rotation by the turbine when the thrust generated by the turbomachine reaches a threshold value.

According to one possible feature, the electric motor is activated for a duration comprised between 100 seconds and 400 seconds.

According to a second aspect, the invention relates to a turbomachine for aircraft comprising:

a turbine which is located downstream of a combustion chamber which is connected to a shaft, the turbine comprising a casing and a plurality of blades;

a fuel injection device which is configured to inject fuel into the combustion chamber;

a thrust calculation device which is configured to calculate the thrust generated by the turbomachine;

an electric motor which is connected to the shaft;

a control system connected to the thrust calculation device, to the fuel injection device and to the electric motor, the control system being configured to implement the method according to any one of the preceding features.

According to one possible feature, the turbomachine is of the double spool, double flow type, the turbine being a high-pressure turbine and the shaft being a high-pressure shaft.

According to a third aspect, the invention relates to an aircraft comprising a turbomachine according to any one of the preceding characteristics.

BRIEF DESCRIPTION OF THE DRAWINGS

Other features and advantages of the present invention will be revealed by the description given below, with reference to the appended drawings which illustrate an exemplary embodiment of it lacking any limiting character.

FIG. 1 shows schematically a turbomachine for aircraft.

FIG. 2 shows a comparison of the evolution of the temperature of the exhaust gases of a turbomachine of the prior art and of a turbomachine according to the invention.

DESCRIPTION OF THE EMBODIMENTS

FIG. 1 illustrates schematically an aircraft turbomachine 1 of the double spool and double flow type comprising, from upstream to downstream in the direction of the air flow, a fan 2, a low-pressure (BP) compressor 3, a high-pressure (HP) compressor 4, a combustion chamber 5, a high-pressure (HP) turbine 6, and a low-pressure (BP) turbine 7. However, the invention can apply to a turbomachine having a different structure.

The high-pressure turbine 6 is connected to the high-pressure compressor 4 by a high-pressure shaft 8, and the low-pressure turbine 7 is connected to the low-pressure compressor 3 and to the fan 2 by a low-pressure shaft 9.

The high-pressure turbine 6 comprises a plurality of blades 61 which are surrounded by a casing 62. The blades 61 comprise a tip which is located facing the casing 62, the tip of the blades 61 being spaced from said casing 62 by a clearance.

The turbomachine 1 also comprises an electric motor 10 which is connected to the high-pressure shaft 8, the electric motor 10 allowing driving said high-pressure shaft 8 in rotation. The electric motor 10 can for example be located in the accessory gearbox or AGB of the turbomachine 1. The electric motor 10 can for example be supplied with power by a battery 11.

The turbomachine 1 comprises a fuel injection device 12 which allows injecting the fuel into the combustion chamber 5. The fuel injection device 12 can in particular comprise a pump which is connected to a fuel reservoir.

The turbomachine 1 also comprises a thrust calculation device 13 which is configured to calculate the thrust generated by the turbomachine 1 during its operation. The thrust generated by the turbomachine 1 can for example be calculated based on the speed of rotation of the fan 2, on the total pressure upstream of the turbomachine, on the total temperature upstream of the turbomachine 1, and on the temperature difference of the outside air and the standard atmosphere (ISA for "International Standard Atmosphere"). The thrust generated by the turbomachine 1 can also be calculated based on the pressure of the air in the fan 2 and the pressure of the air in the low-pressure turbine 7. Thus, the thrust calculation device 13 can comprise a plurality of sensors distributed over the turbomachine 1 or on the aircraft in order to measure the physical quantities allowing calculation of the thrust generated by the aircraft.

The turbomachine 1 comprises a control system 14 which is connected to the electric motor 10, to the fuel injection device 12 and to the thrust calculation device 13. The thrust calculation device 14 can also be connected to the battery 11. The control system 14 thus provides for the control of the electric motor 10 and of the fuel injection device 12, and the control system 14 acquires the thrust calculated by the thrust calculation device 13. According to one possible variant, the electrical power necessary to the operation of the electric motor is supplied by an electrical source which is located in the aircraft, and therefor outside the turbomachine 1. This electrical source in the aircraft can for example comprise the auxiliary power unit (or APIA).

The control system 14 is configured to implement a method for regulating a temperature of the exhaust gases of the turbomachine 1. To this end, the control system 14 can comprise, on the one hand, a memory in which the method is recorded, and on the other hand a processor for executing the method recorded in the memory.

The method for regulating the temperature of the exhaust gases of the turbomachine 1 comprises the following steps:

regulating the injection of fuel into the combustion chamber 12 so that the turbomachine 1 generates a target thrust;

regulating the injection of mechanical power by the electric motor 10 on the high-p-pressure shaft 8, the electric motor 10 being activated when the clearance between the tip of the blades 61 and the casing 62 exceeds a threshold value. The threshold value of the clearance can for example be 0.6 mm.

The steps of the method are carried out simultaneously.

The Applicant has in fact become aware that, due to the fact that the clearance between the blades 61 and the casing 62 is too great, and that the efficiency of the high-pressure turbine 6 is therefore reduced, it is preferable to inject mechanical power via the electric motor 10 rather than injecting additional fuel into the combustion chamber 5 to compensate the loss of efficiency.

The method for regulation is particularly advantageous for the takeoff phase of the aircraft, and even more particularly during the first start of the turbomachine of the day. The value of the target thrust can thus be equal to the takeoff thrust.

The injection of mechanical power by the electric motor 10 can be accomplished for a duration comprised between 100 seconds and 400 seconds or comprised between 100 seconds and 300 seconds, or comprised between 200 seconds and 300 seconds. The Applicant has in fact noticed that the clearance between the casing 62 and the blades 61 tends to open for a duration which can generally reach 400 seconds, the opening of the clearance reaching a peak at the beginning and gradually diminishing afterward.

A method of this type can be implemented according to three possible variants.

According to a first possible variant, the fact that the clearance between the blades 61 and the casing 62 is greater than a threshold value is detected by using the temperature of the exhaust gases of the turbomachine 1 (EGT or "exhaust gas temperature"), The applicant has in fact observed the link between the temperature of the exhaust gas of the turbomachine 1 and the clearance between the blades 61 and the casing 62, too high a temperature of the exhaust gas of the turbomachine 1 being due to over-consumption of fuel caused by the increase of the clearance between the blades 61 and the casing 62.

Thus, according to the first variant, the regulation of the injection of mechanical power by the electric motor 10 is accomplished by the control system 14 by determining the temperature of the exhaust gas of the turbomachine 1, the control system 14 controlling the injection of mechanical power by the electric motor 10 onto the high-pressure shaft 8 when the temperature of the exhaust gas of the turbomachine 1 reaches a predetermined threshold value. The regulation of the electric motor 10 by the control system 14 is accomplished using a closed loop.

The temperature of the exhaust gas of the turbomachine 1 can be determined based on the injection of fuel into the combustion chamber by using a physical model with is entered into the control system and which gives the exhaust gas temperature as a function of the injected fuel.

The temperature of the exhaust gas of the turbomachine 1 can also be determined by measuring said temperature of the exhaust gas with a temperature sensor located in the exhaust casing of the turbomachine 1, said temperature being connected to the control system 14. The temperature sensor can, according to another alternative, be located in a low-pressure guide nozzle or at the level of the low-pressure guide nozzle. The low-pressure guide nozzle is formed by the fixed blading of the low-pressure turbine 7.

According to a second possible variant, the regulation carried out by the control system 14 of the injection of mechanical power by the electric motor 10 is accomplished by determining the clearance between the casing 62 and the blades 61 of the high-pressure turbine 6, the control system 14 activating the injection of mechanical power by the electric motor 10 onto the high-pressure shaft 8 when the clearance between the casing and the blades of the turbine reaches the threshold value. The regulation of the electric motor 10 by the control system 14 is accomplished in a closed loop.

The clearance between the tip of the blades 61 and the casing 62 can be determined due to a sensor installed on the high-pressure turbine 6 which measures the distance between the tip of the blades 61 and the casing 62.

The clearance between the casing 62 and the blades 61 can also be determined based on a temperature of the air at the high-pressure turbine 6 (the temperature of the stream) and on the temperature of the casing 62, thus allowing determining the difference in thermal dilation between the disk of the high-pressure turbine 6 and the casing 62.

According to another possible solution, the clearance between the blades 61 and the casing 62 can be determined based on the temperature of the casing 62 and the temperature of the disk of the high-pressure turbine 6, thus allowing determining the difference in thermal dilation between the disk of the high-pressure turbine 6 and the casing 62.

According to a third possible variant, the regulation of the injection of mechanical power is carried out in an open loop, and not in a closed loop as is the case in the first variant and the second variant. In the third variant, the control system 14 controls the electric motor 10 to inject mechanical power onto the high-pressure shaft 8 when the thrust generated by the turbomachine 1 reaches a threshold value.

The injection of mechanical power onto the high-pressure shaft 8 when the generated thrust reaches a threshold value is accomplished according to a profile which is predetermined and which is recorded in the control system 14. According to an advantageous variant, the mechanical power injection profile is based to take the worst case into account, the case in which the efficiency of the turbomachine 1 is negatively impacted by the opening of the clearance between the casing 62 and the blades 61.

Advantageously, the control system 14 activates the electric motor 10 to inject mechanical power when the thrust generated by the turbomachine 1 reaches a target value, and in particular the takeoff thrust.

The applicant has in fact observed that the clearance between the casing 62 and the blades 61 tends to increase at the end of the acceleration of the turbomachine 1, the maximum clearance arriving approximately 1 minute after the end of acceleration.

As can be seen in FIG. 2, which illustrated the difference in evolution of the temperature of the exhaust gas between a turbomachine of the prior art and a turbomachine according to the invention, the invention allowing reducing, even eliminating the temperature peak of the exhaust gas of the turbomachine 1 during the first takeoff of the aircraft.

In the previously described exemplary embodiment, the clearance to be monitored is the clearance of the high-pressure turbine 6, and the electric motor 10 injects mechanical power onto the high-pressure shaft 8; however, the invention can also be applied to the low-pressure turbine 7, the electric motor 10 injecting mechanical power onto the low-pressure shaft 9.

The invention claimed is:

1. A method for regulating a temperature of exhaust gases of a turbomachine, the method comprising:
   regulating injection of fuel into a combustion chamber of the turbomachine so that the turbomachine generates a target thrust, and
   regulating injection of mechanical power by an electric motor onto a shaft driven in rotation by a turbine, the electric motor being activated when a clearance between a casing and blades of the turbine exceeds a first threshold value.

2. The method according to claim 1, wherein the regulation of the injection of mechanical power by the electric motor is accomplished by determining the temperature of the exhaust gas of the turbomachine, the electric motor injecting mechanical power onto the shaft driven in rotation by the turbine when the temperature of the exhaust gases of the turbomachine reaches a predetermined second threshold value.

3. The method according to claim 2, wherein the temperature of the exhaust gases of the turbomachine is determined based on the injection of the fuel into the combustion chamber.

4. The method according to claim 3, wherein the temperature of the exhaust gases of the turbomachine is determined by measurement with a sensor.

5. The method according to claim 1, wherein the regulation of the injection of mechanical power by the electric motor is accomplished by determining the clearance between the casing and the blades of the turbine, the electric motor injecting mechanical power onto the shaft driven in rotation by the turbine when the clearance between the casing and the blades of the turbine reaches the first threshold value.

6. The method according to claim 5, wherein the clearance between the casing and the blades of the turbine is determined by measurement with a sensor.

7. The method according to claim 5, wherein the clearance between the casing and the blades of the turbine is determined based on a temperature of the air in the turbine and on a temperature of the casing of the turbine.

8. The method according to claim 5, wherein the clearance between the casing and the blades of the turbine is determined based on a temperature of the casing of the turbine and on a temperature of a disk of the turbine.

9. The method according to claim 1, wherein the regulation of the injection of mechanical power by the electric motor is accomplished by measuring the thrust generated by the turbomachine, the electric motor injecting mechanical power onto the shaft driven in rotation by the turbine when the thrust generated by the turbomachine reaches a third threshold value.

10. A turbomachine for an aircraft comprising:
- a turbine which is located downstream of a combustion chamber which is connected to a shaft, the turbine comprising a casing and a plurality of blades;
- a fuel injection device which is configured to inject fuel into the combustion chamber;
- a thrust calculation device which is configured to calculate the thrust generated by the turbomachine;
- an electric motor which is connected to the shaft;
- a control system connected to the thrust calculation device, to the fuel injection device and to the electric motor, the control system being configured to implement a method for regulating a temperature of exhaust gases of the turbomachine, the method including
  - regulating injection of the fuel into the combustion chamber of the turbomachine so that the turbomachine generates a target thrust, and
  - regulating injection of mechanical power by the electric motor onto the shaft driven in rotation by the turbine, the electric motor being activated when a clearance between the casing and the plurality of blades of the turbine exceeds a first threshold value.

11. The turbomachine according to claim 10, wherein the turbomachine is a double spool or a double flow turbomachine, the turbine being a high-pressure turbine and the shaft being a high-pressure shaft.

12. An aircraft comprising the turbomachine according to claim 10.

* * * * *